(12) United States Patent
Lee et al.

(10) Patent No.: US 10,004,083 B2
(45) Date of Patent: Jun. 19, 2018

(54) METHOD FOR CONTROLLING BASE STATION IN MULTI-RAT ENVIRONMENT AND TRANSMITTING/RECEIVING DATA ACCORDING TO CONTROL OF BASE STATION, AND APPARATUS FOR PERFORMING SAME

(71) Applicant: LG ELECTRONICS INC., Seoul (KR)

(72) Inventors: Eunjong Lee, Seoul (KR); Heejeong Cho, Seoul (KR); Jaehoon Chung, Seoul (KR); Genebeck Hahn, Seoul (KR); Hyeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 15/032,033

(22) PCT Filed: Oct. 6, 2014

(86) PCT No.: PCT/KR2014/009373
§ 371 (c)(1),
(2) Date: Apr. 25, 2016

(87) PCT Pub. No.: WO2015/064922
PCT Pub. Date: May 7, 2015

(65) Prior Publication Data
US 2016/0262170 A1    Sep. 8, 2016

Related U.S. Application Data

(60) Provisional application No. 61/897,230, filed on Oct. 30, 2013.

(51) Int. Cl.
*H04W 72/12* (2009.01)
*H04W 16/14* (2009.01)
(Continued)

(52) U.S. Cl.
CPC ....... *H04W 72/1215* (2013.01); *H04W 16/14* (2013.01); *H04W 72/1247* (2013.01);
(Continued)

(58) Field of Classification Search
CPC .................................... H04W 72/1215
See application file for complete search history.

(56) References Cited

U.S. PATENT DOCUMENTS

2010/0062785 A1    3/2010 Hwang
2010/0261482 A1*  10/2010 Guey ..................... H04B 7/024
                                                    455/452.2

(Continued)

FOREIGN PATENT DOCUMENTS

JP    2012130183    6/2012
JP     201317384    1/2013
(Continued)

OTHER PUBLICATIONS

PCT International Application No. PCT/KR2014/009373, Written Opinion of the International Searching Authority dated Jan. 22, 2015, 20 pages.

(Continued)

*Primary Examiner* — John Blanton
(74) *Attorney, Agent, or Firm* — Lee Hong Degerman Kang Waimey

(57) ABSTRACT

A method for controlling, by an entity of a first radio access technology (RAT), a base station of a second RAT in a multi-RAT environment, according to one embodiment of the present invention, comprises the steps of: determining an operation mode of the base station of the second RAT; and transmitting, to the base station of the second RAT, a message instructing a transition to the determined operation mode, wherein the message changes the opportunity for the second RAT to occupy a radio resource through a contention (Continued)

between the base station of the second RAT and a terminal connected to the first RAT.

8 Claims, 9 Drawing Sheets

(51) Int. Cl.
  *H04W 88/06* (2009.01)
  *H04W 92/20* (2009.01)
  *H04W 74/08* (2009.01)
(52) U.S. Cl.
  CPC .......... *H04W 74/08* (2013.01); *H04W 74/085* (2013.01); *H04W 88/06* (2013.01); *H04W 92/20* (2013.01)

(56) References Cited

U.S. PATENT DOCUMENTS

| | | |
|---|---|---|
| 2012/0028645 A1 | 2/2012 | Kim et al. |
| 2012/0170556 A1 | 7/2012 | Tsfati et al. |
| 2013/0058233 A1* | 3/2013 | Kim ................ H04L 5/001 370/252 |
| 2015/0359008 A1* | 12/2015 | Wang ............ H04W 74/004 370/330 |

FOREIGN PATENT DOCUMENTS

| | | |
|---|---|---|
| JP | 2014515245 | 6/2014 |
| KR | 10-1202901 | 11/2012 |
| WO | 2009-145537 | 12/2009 |
| WO | 2010-147400 | 12/2010 |
| WO | 2011092370 | 8/2011 |
| WO | 2012093349 | 7/2012 |
| WO | 2012109195 | 8/2012 |
| WO | 2013-009111 | 1/2013 |

OTHER PUBLICATIONS

Japan Patent Office Application No. 2016-099592, Office Action dated Jun. 6, 2017, 2 pages.
European Patent Office Application Serial No. 14857199.5, Search Report dated May 22, 2017, 11 pages.

* cited by examiner (a)

(b)

(c)

(d)

METHOD FOR CONTROLLING BASE STATION IN MULTI-RAT ENVIRONMENT AND TRANSMITTING/RECEIVING DATA ACCORDING TO CONTROL OF BASE STATION, AND APPARATUS FOR PERFORMING SAME

CROSS-REFERENCE TO RELATED APPLICATIONS

This application is the National Stage filing under 35 U.S.C. 371 of International Application No. PCT/KR2014/009373, filed on Oct. 6, 2014, which claims the benefit of U.S. Provisional Application No. 61/897,230, filed on Oct. 30, 2013, the contents of which are all hereby incorporated by reference herein in their entirety.

TECHNICAL FIELD

The present invention relates to mobile communication, and more particularly, to a method and apparatus for controlling an operating mode of an eNB of other radio access technologies (RATs) or an operating method and apparatus under control of an entity of other RATs in a multi-RAT environment.

BACKGROUND ART

Multi-RAT in which heterogeneous communication networks are merged has been researched. For example, a multi-RAT user equipment (UE) supports both a cellular network and a wireless local area network (WLAN). Such a multi-RAT UE can selectively access any one of a plurality of RATs but cannot simultaneously access the plurality of RATs. That is, even when a UE has multi-RAT capabilities, the UE cannot simultaneously transmit and receive data via different RATs.

In a multi-RAT environment, when link with a specific RAT is unpredictably disconnected while a UE accesses the specific RAT and transmits and receives data, the UE terminates access to the specific RA and accesses another RAT. However, there is a problem in that data that has been transmitted and received to and from the specific RAT cannot be seamlessly transmitted and received to and from another newly accessed RAT.

DISCLOSURE

Technical Problem

An object of the present invention devised to solve the problem lies in a method for transmitting and receiving data, for dynamically setting a priority level between downlink and uplink of a specific RAT in consideration of status of a user equipment (UE) and status of a network that supports multi-RAT.

It is to be understood that both the foregoing general description and the following detailed description of the present invention are exemplary and explanatory and are intended to provide further explanation of the invention as claimed.

Technical Solution

The object of the present invention can be achieved by providing a method for controlling a base station (BS) of a second radio access technology (RAT) by an entity of a first RAT in a multi-RAT environment, the method including determining an operating mode of the BS of the second RAT, and transmitting a message for requesting for transition into the determined operating mode to the BS of the second RAT, wherein the message changes an opportunity that the BS of the second RAT occupies a radio resource of the second RAT through contention with a user equipment (UE) that accesses the first RAT.

In another aspect of the present invention, provided herein is a method for transmitting and receiving data under control of an entity of a first radio access technology (RAT) by a base station (BS) of a second RAT in a multi-RAT environment, the method including receiving a message for requesting for transition into an operating mode of the BS of the second RAT from the entity of the first RAT, and transiting the operating mode based on the message, wherein the transiting of the operating mode includes changing an opportunity that the BS of the second RAT occupies a radio resource of the second RAT through contention with a user equipment (UE) that accesses the first RAT.

In another aspect of the present invention, provided herein is an entity of a first radio access technology (RAT) for controlling a base station (BS) of a second RAT in a multi-RAT environment, the entity including a processor for determining an operating mode of the second RAT, and a transmitter for transmitting a message for requesting for transition into the determined operating mode to the BS of the second RAT, wherein the message changes an opportunity that the BS of the second RAT occupies a radio resource of the second RAT through contention with a user equipment (UE) that accesses the first RAT.

In another aspect of the present invention, provided herein is a base station (BS) of a second radio access technology (RAT) for transmitting and receiving data under control of an entity of a first RAT in a multi-RAT environment, the BS including a receiver for receiving a message for requesting for transition into an operating mode of the BS of the second RAT from the entity of the first RAT, and a processor for transiting the operating mode based on the message, wherein the processor changes an opportunity that the BS of the second RAT occupies a radio resource of the second RAT through contention with a user equipment (UE) that accesses the first RAT.

Advantageous Effects

According to an embodiment of the present invention, in an area in which downlink (DL) data of a first radio access technology (RAT) is intensively generated, an eNB of a second RAT may be set to be DL only supported and the eNB of the second RAT may be set to be UL only supported for a user equipment (UE) positioned at a cell boundary or shadow area of the first RAT so as to reduce inter-cell interference, thereby enhancing overall throughput of a system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BEST MODE

Figure 1A:
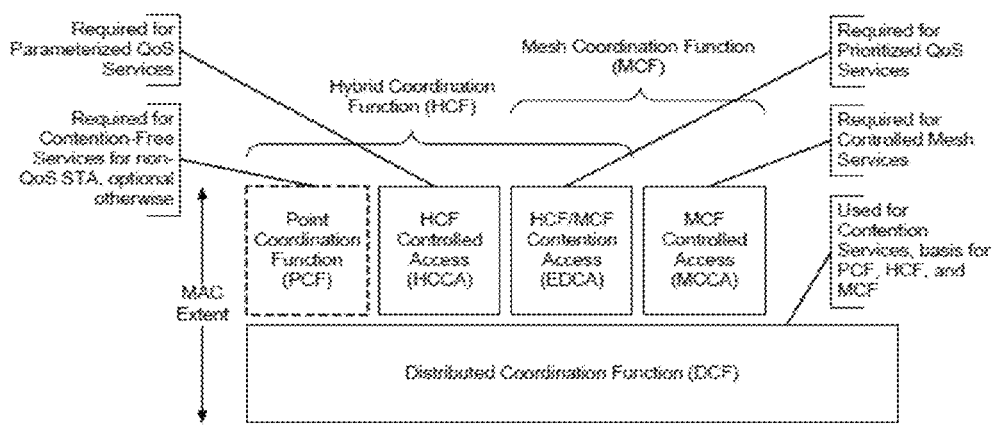
FIG. 1A is a diagram illustrating a medium access control (MAC) architecture of IEEE 802.11.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, a first RAT is a cellular system or a cellular network. For example, assume that the first RAT is a 3GPP LTE or LTE-A system. However, the first RAT may be implemented by another arbitrary cellular system except for unique items of the 3GPP LTE or LTE-A system. A second RAT is a wireless communication system or a wireless communication network using a wireless communication method different from that of the first RAT and may be a data transmission system having coverage relatively smaller than that of the first RAT. For example, the second RAT may be a wireless local area network (WLAN) system such as WLAN or Wi-Fi, but is not limited thereto.

In the following description, assume that a terminal is a generic term for a mobile or fixed user-end device such as a user equipment (UE), a mobile station (MS), an advanced mobile station (AMS), a station (STA) and the like. In addition, assume that a base station is a generic name for any node, which communicates with a terminal in a first RAT or a second RAT, such as a Node B, an eNode B, a base station, an access point (AP) and the like. Although a 3GPP LTE/LTE-A, an IEEE 802.16 or an IEEE 802.11 system is focused upon in the present specification, the present invention is applicable to various different communication systems. In the following description, a base station of a second RAT is a generic name for any node, which communicates with a terminal in a second RAT, such as an AP.

In the first RAT, a UE may receive information from a base station in downlink and transmit information in uplink. Information transmitted or received by the UE includes data and a variety of control information and physical channels differ according to type and usage of information transmitted or received by the UE.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with radio technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs OFDMA in downlink and employs the SC-FDMA in uplink. LTE-Advanced (LTE-A) is an evolved version of the 3GPP LTE.

A station (STA) includes an AP STA and a non-AP STA. The non-AP STA may correspond to a device that a user generally directly handles, such as a lap-top computer and a mobile phone. The non-AP STA may also be referred to as a terminal, a wireless transmit/receive unit (WTRU), a user equipment (UE), a mobile station (MS), a mobile terminal, a mobile subscriber station (MSS), and so on. In addition, the AP is the concept corresponding to a base station (BS), a node-B, an evolved node-B, a base transceiver system (BTS), a femto BS, and so on in other communication fields.

It should be noted that specific terms disclosed in the present invention are proposed for convenience of description and better understanding of the present invention, and the use of these specific terms may be changed to another format within the technical scope or spirit of the present invention.

IEEE 802.11

FIG. 1A is a diagram illustrating a MAC architecture of IEEE 802.11. In IEEE 802.11, downlink is unidirectional link to a non-AP STA from an AP, and uplink is unidirectional link to an AP from a non-AP STA.

A distributed coordination function (DCF) may use a carrier sense multiple access with collision avoidance (CSMA/CA) as a fundamental access method for IEEE 802.11 MAC. The DCF employs the access mechanism "listen before talk". Prior to transmission, an AP and/or an STA may perform clear channel assessment (CCA) for sensing a radio channel or a medium during a predetermined time interval (e.g., DCF inter-frame space (DIFS)). As the sensing result, upon determining that the medium is in an idle status, frame transmission may be begun through the corresponding medium. On the other hand, upon detecting that the medium is in an occupied status, the corresponding AP and/or STA may set a delay period (e.g., a random backoff period) for medium access without starting of transmission of the STA and attempt frame transmission after on standby during the random backoff period. Since the backoff period is applied, it may be expected that a plurality of STAs attempt frame transmission after on standby during different time periods, thereby minimizing collision.

IEEE 802.11 provides a point coordination function (PCF) as an optional access method other than the DCF. The PCF may be a polling-based synchronization type access method for periodically polling a data frame such that all receiving APs and/or STAs receive the data frame. The PCF can be used only in an infrastructure network and may be used to determine an STA with transfer authority by an AP of a basic service set (BSS).

A QoS facility of IEEE 802.11 may include a hybrid coordination function (HCF) as an additional coordination function. The HCF can be used only in a QoS network configuration. The HCF can be embodied in all QoS STAs except for a mesh STA. The HCF is based on the DCF and a point coordination function (PCF). The HCF may have enhanced distributed channel access (EDCA) and HCF controlled channel access (HCCA). The EDCA may use a contention-based access method for providing a data frame to a plurality of users by a provider and the HCCA may use a non-contention-based channel access method using a polling mechanism. In addition, the HCF may include a medium access mechanism for enhancing quality of service (QoS) of a WLAN and may transmit QoS data in both a contention period (CP) and a contention free period (CFP).

As described above, the DCF may be applied to all STAs. In order to perform transmission by a STA, whether transmission by another STA is performed needs to be sensed, and when a transmission medium or a radio channel is not busy, that is, is not occupied, transmission of the corresponding STA may be performed. A CSMA/CA algorithm may position a gap of a minimally specified duration between consecutive frame sequences. A transmission STA may determine whether a medium is idle during a defined gap prior to transmission. When a medium is busy, the STA needs to hold transmission of the STA until current transmission is terminated. After transmission is held or transmission of a SAT is successfully performed, the STA may select a random backoff interval and reduce a backoff interval counter while the medium is idle in order to perform transmission.

When an ACK frame is received from an STA specified by a receiver address (RA) field of a transmitted frame or transmission of a frame with a group address is completed in an RA field, transmission is successful. In order to more reduce collision between STAs, schemes obtained by partially modifying the aforementioned methods may be used. For example, a transmission STA and a receiving STA may exchange a short control frame (e.g., a request to send (RTS) frame or a clear to send (CTS) frame). Exchange of the short control frame may be performed after determining that a medium is idle, after transmission hold or backoff, or prior to data transmission. Hereinafter, CSMA/CA, transmission hold, and backoff will be described in more detail.

Figure 1B:
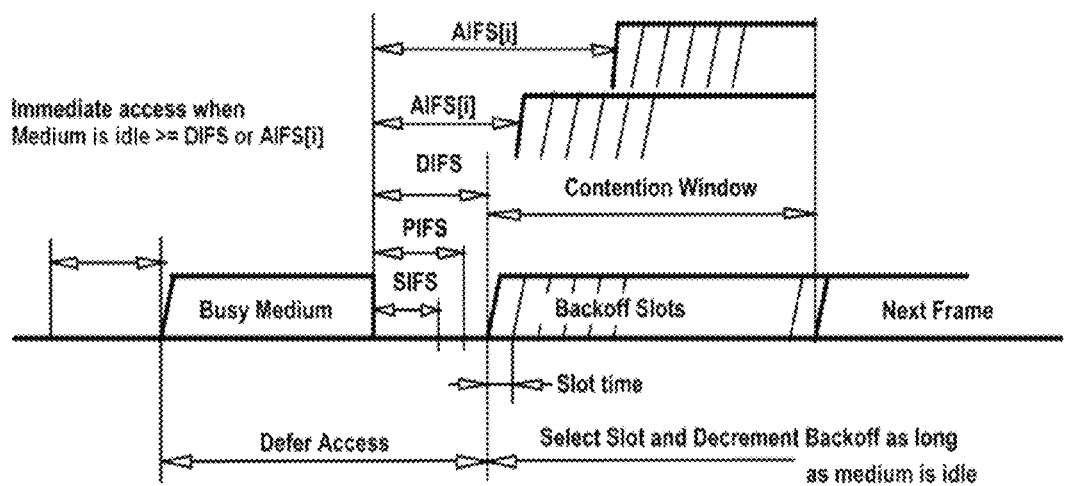
FIG. 1B is a diagram for describing an inter-frame space (IFS) of IEEE 802.11.

FIG. 1B is a diagram for describing an inter-frame space (IFS) of IEEE 802.11. The IFS refers to a time interval between frames. An STA may determine whether a medium is idle using a carrier sensing (CS) function during a specified interval. A plurality of IFSs for providing a priority level for access to a radio medium may be defined. FIG. 1B defines a relationship between IFSs. The IFSs may include a reduced interframe space (RIFS), a short interframe space (SIFS), a PCF interframe space (PIFS), a DCF interframe space (DIFS), an arbitration interframe space (AIFS) (which is used by a QoS facility), and an extended interframe space (EIFS).

IFSs are independent upon a bit rate of an STA. IFS timings may be defined as time gaps on a medium and the residual IFSs except for the AIFSs may be set with a specified value according to a physical layer. IFSs may be determined through attributes specified by a physical layer. A short IFS (SIFS) may be used to transmit RTS/CTS and ACK frames and may have a highest priority level. A PCF IFS (PIFS) may be used to transmit a PCF frame and a DCF IFS (DIFS) may be used to transmit a DCF frame. An extended IFS (EIFS) may be used only when frame transmission error occurs and may not have a fixed interval.

The RIFS may reduce overhead and enhance network efficiency. When response separated from the SIFS is not transmitted, an RIFS may be used instead of the SIFS in order to separate multiple-transmission from one transmission. The RIFS may not be used between frames with different RA values. A length of the RIFS may be defined in Tables 20 to 25 of the 802.11 standard. The RIFS may be time to start of a first symbol of a preamble of a next frame from a last symbol of a previous frame. An STA may not allow time between frames separated by the RIFS to be changed to exceed a range of 10% or more of the RIFS time. Two frames separated by the RIFS may be high-throughput PLCP protocol data units (HT PPDUs).

The SIFS may be used to transmit prior to transmission of a PPDU including an ACK frame, a CTS frame, and a BlockAck frame. The BlockAck frame may be response to a BlockAckReq frame or an A-MPDU, or a second or next MPDU of fragment burst and response of a STA to polling by a PCF. A SIFS may be used by a point coordinator (PC) and used with respect to all types of frames during a contention free period (CFP). The SIFS may be time to start of a first symbol of a preamble of a next frame from end of a last symbol of signal extension or a previous frame. The SIFS may be shortest IFS among IFSs between transmissions from different STAs. The SIFS may be used when an STA needs to occupy a medium and needs to maintain the medium to be occupied during a sequence of frame exchange to be performed. A shortest gap between transmissions may be used so as to prevent a medium from being occupied by other STAs. Accordingly, priority may be given with respect to completion of a sequence of proceeding frame exchange.

The PIFS may be used to acquire prioritized access authority to a medium. The PIFS may be used in the following case: when a STA determines that a medium is idle at a transmission PIFS slot boundary and then starts transmission of the STA using the PIFS except for the cases in which (i) the STA operates as a PCF; (ii) the STA transmits a channel switch announcement frame; (iii) the STA transmits a traffic indication map (TIM) frame; (iv) the a hybrid coordinator (HC) starts a contention-free period (CFP) or transmission opportunity (TXOP); (v) a HC or a non-AP QoS STA is a polled TXOP holder being recovered because cannot perform unpredictable reception in a controlled access phase (CAP); (vi) a high throughput (HT) STA uses dual clear to send (CTS) projection prior to transmission of clear to send 2 (CTS2); (vii) a TXOP holder continues transmission after failure in transmission; (viii) a receiver direction (RD) initiator continues transmission through error recovery; (ix) an HT AP transmits a PSMP sequence in a power save multi poll (PSMP) recovery frame; (x) an HT STA performs clear channel assessment (CCA) in a secondary channel prior to transmission of 40 MHz mask PPDU using an enhanced distributed channel access (EDCA) channel access; and (xi) CCA is performed in a sub channel.

The DIFS may be used by an STA that transmits data frames MPDUs and management frames MMPDUs according to a DCF. After a frame is completely received and backoff time expires, when a CS mechanism of an STA determines that a medium is idle at a transmission DIFS slot boundary, the corresponding STA may perform transmission using the DCF.

The AIFS may be used by QoS STAs that access a medium using an enhanced distributed channel access function (EDCAF). The AIFS may be used to transmit PS-Poll, RTS, CTS that is not response of RTS, BlockAckReq, and BlockAck that is not response of BlockAckReq. When a STA using the EDCAF determines that a medium is idle at an AIFS slot boundary by a CS mechanism, reception of a frame is completed and backoff time with respect to an access category (AC) expires, and then TXOP may be acquired for the AC. A QoS STA may calculate a period of each AIFS using a value of dot11EDCATableAIFSN of a management information base (MIB). In an infrastructure BSS, QoS STAs may update a value of dot11EDCATableAIFSN using latest information of EDCA parameter set element of beacon frames received from an AP of the BSS. The QoS AP may calculate a period of the AIFS using the dot11QAPEDCATableAIFSN of the MIB.

When it is determined that a medium is idle after a frame with HY-RXEND.indication primitive containing error is received or a frame with incorrect a MAC frame check sequence (FCS) value is received, a DCF uses EIFS prior to transmission. Similarly, an EDCA mechanism according to the HCF of STAs may use an interval of EIFSDIFS+ AIFS. The interval of EIFS or EIFS-DIFS+ AIFS may be initiated after there is indication indicating that a medium is idle after a frame with error is detected. A virtual CS mechanism may not be considered. An STA may not start transmission until a latest one of NAV, EIFS, or EIFS-DIFS+ AIFS expires. The EIFS and the EIFS-DIFS+ AIFS may be defined so as to sufficiently provide time for response to different STAs. Here, response of different STAs may be related to a frame that is wrongly received prior to start of transmission of different STAs. Reception of a frame without error during EIFS or EIFSDIFS+ AIFS may re-synchronize an STA with respect to busy/idle states of a medium. Accordingly, the EIFS or EIFS-DIFS+ AIFS may be terminated, and medium access using a DIFS, an AIFS, of backoff may continue a next frame. At a time point when EIFS or EIFS-DIFS+AIFS expires or is terminated, an STA may return to a NAV or a physical CS in order to control medium access.

When the NAS is updated by a frame that causes the EIFS, for example, a MAC frame check sequence (FCS) fails, and when a non-high-throughput signal field (L-SIG) TXOP function updates the NAV through L-SIG information, the EIFS may not be used. When frames of A-MPDU are correctly received, the EIFS may not be used for the A-MPDU.

Figure 1C:
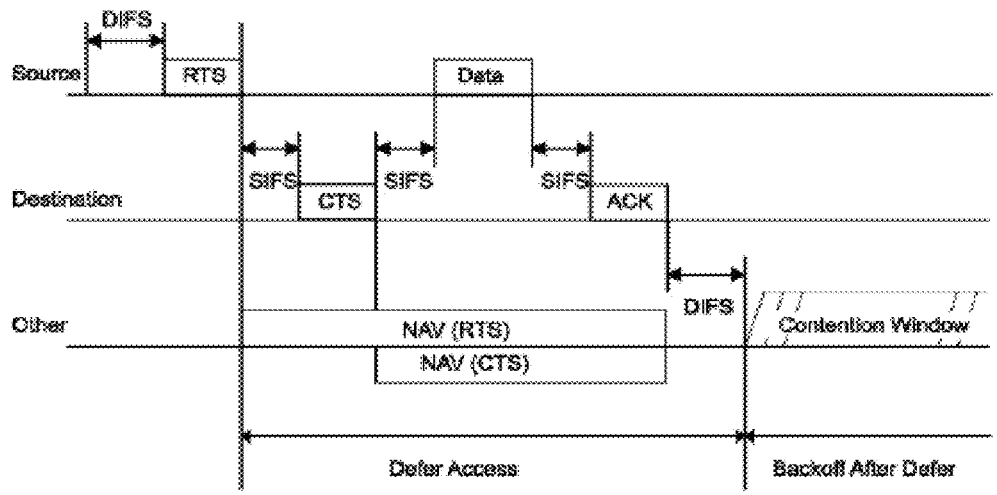
FIG. 1C is a diagram for explanation of setting and resetting of a network allocation vector (NAV) of IEEE 802.11.

FIG. 1C is a diagram for explanation of setting and resetting of a network allocation vector (NAV) of IEEE 802.11.

As described above, a CSMA/CA mechanism may also include virtual carrier sensing other than physical carrier sensing for directly sensing a medium by an AP and/or an STA. The virtual carrier sensing may compensate for a problem that may occur in medium access, such as a hidden node problem. For the virtual carrier sensing, a MAC of a wireless LAN system may use a network allocation vector (NAV). The NAV may be a value that indicates the residual time until a medium become to be available to other APs and/or STAs by an AP and/or STA that currently uses the medium or has authority for using the medium. Accordingly, a value set as the NAV may correspond to a period when use of a medium is expected by an AP and/or STA that transmits a corresponding frame, and an STA that receives the value of the NAV may be inhibited to access a medium during the corresponding period. The NAV may be set according to, for example, a value of a duration field of a MAC header of a frame.

A STA that receives at least one valid frame in a received physical layer convergence procedure (PLCP) service data unit (PSDU) may update a NAV with respect to all frames with a new NAV value greater than a current NAV except that RA is identical to a MAC address of the STA. According to reception of a PS-Poll frame, the STA may update NAV setting according to a data rate selection rule using a time length obtained by summing required for an ACK frame and an SIFS interval. Under various conditions, the NAV may be set or reset. When PHYRXEND. indication primitive is received, a NAV updating operation may be performed.

FIG. 1C illustrates a NAV with respect to STAs that receive an RTS frame when other STAs receive only a CTS frame. An STA that updates NAV setting through a latest RTS frame may reset the NAV when PHY-RXSTART.indication primitive is not detected from a physical layer during a predetermined time period. Here, the predetermined time period may be time of (2×SIFS time (aSIFSTime))+(CTS_Time)+aPHY-RX-START-Delay+(2×aSlotTime) started from PHY-RXEND.indication primitive corresponding to detection of an RTS frame. The CTS_time may be calculated based on a length of a CTS frame and a data rate at a time point when an RST frame used to update a latest NAV is received.

When PHY-RXSTART.indication primitive is not received from a physical layer during a predetermined time period, an STA that supports L-SIG TXOP using a terminal of other L-SIG periods and a latest MAC period for updating NAV setting may reset the NAV. Here, the predetermined time period may be started from termination of the L-SIG period and may correspond to a length of aSIFSTime+ aPHY-RX-START-Delay+(2×aSlotTime).

Figure 1D:
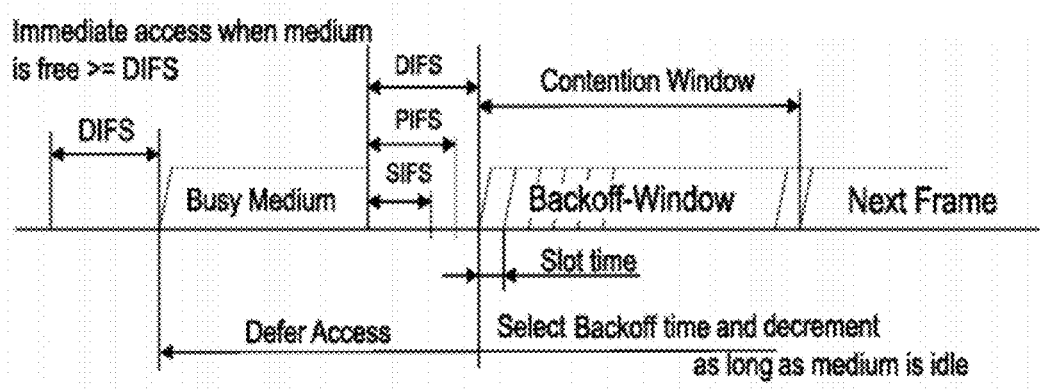
FIG. 1D is a diagram illustrating a distributed coordination function (DCF) access procedure of IEEE 802.11.

FIG. 1D is a diagram illustrating a distributed coordination function (DCF) access procedure of IEEE 802.11.

Basic access may be a core mechanism for determining whether an STA performs transmission using DCF. In the case of a CP without a PC or using a PCF access method when a medium equal to or above EIFS or DIFS, of a case in which a medium-busy event occurs immediately according to reception of a frame with a proper MAC FCS value, is idle, an STA that operates according to a DCF access method may transmit MPDU. When a medium is busy if an STA intends to initialize an initial frame of a frame exchange sequence, a random backoff procedure may be performed. Control of a channel by an STA having a frequency hopping (FH) physical layer may be lost at a dwell time boundary and the STA may recover a channel after the dwell time boundary. The STA having a frequency hopping (FH) physical layer may be required to complete transmission of all MPDUs and related response prior to the dwell time boundary.

When the MPDU is transmitted or retransmitted, time for transmission and response of the MPDU is not sufficient in the dwell. The STA may randomly select backoff time using a current contention window (CW) to hold transmission.

Figure 1E:
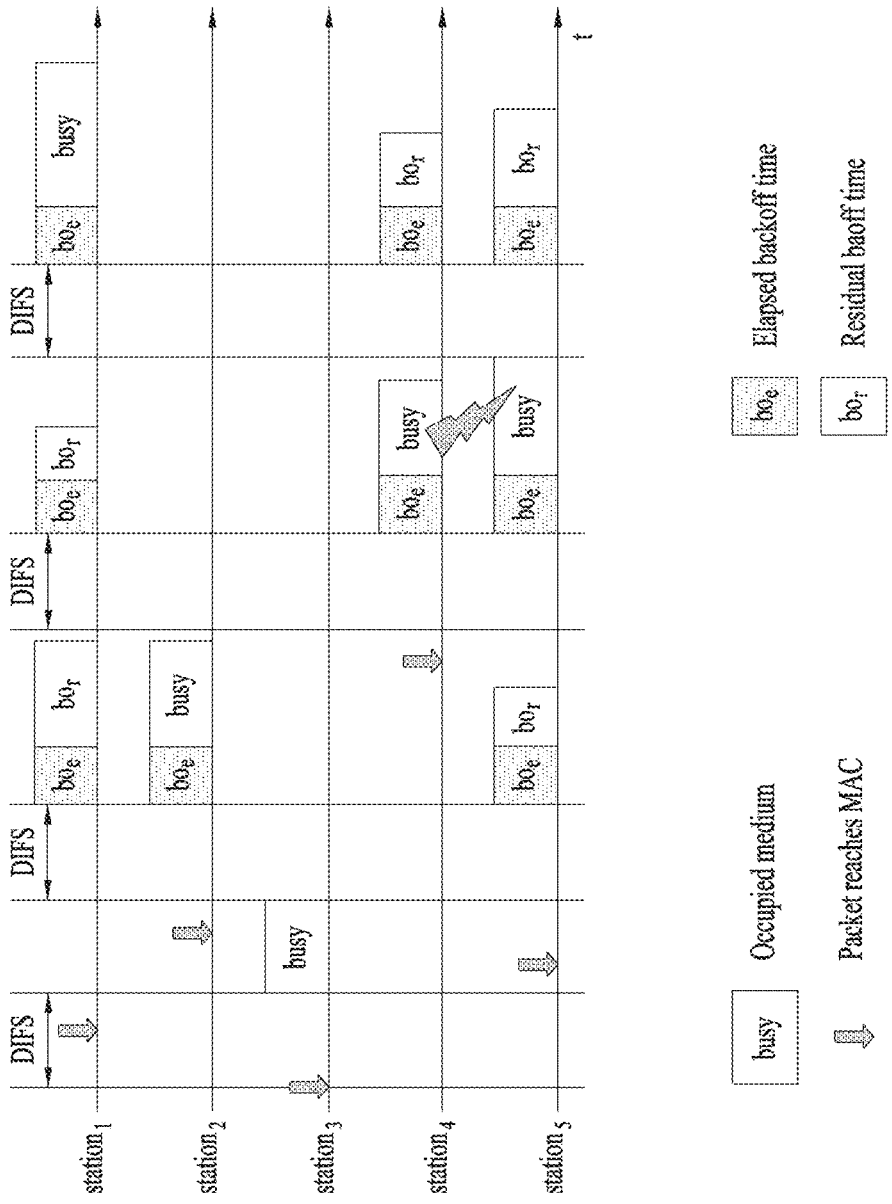
FIG. 1E is a diagram illustrating a backoff procedure for a DCF of IEEE 802.11.

FIG. 1E is a diagram illustrating a backoff procedure for a DCF of IEEE 802.11.

With reference to FIG. 1E, an operation based on a random backoff period will be described. When a medium that has been in an occupied or busy status is changed to an idle status, a plurality of STAs may attempt to transmit data (or frame). In this case, in order to minimize collision, STAs may randomly select a random backoff count, may be on standby by as much as a slot time corresponding to the selected random backoff count, and then may attempt transmission. Backoff slots may be positioned after a DIFS in which a medium is determined to be idle during a corresponding period. The random backoff count may have a pseudo-random integer value and may be determined as one of 0 to CW. Here, CW is a contention window parameter value. The parameter CW may be given by CWmin as an initial value, and in the case of failure in transmission (e.g., when ACK to a transmitted frame cannot be received), the parameter CW may have a doubled value. When a value of the parameter CW is CWmax, data transmission may be attempted while a value of CWmax is maintained until data transmission is successful, and when data transmission is successful, the parameter CW may be reset to a value of CWmin. Values of CW, CWmin, and CWmax may be set according to $2n-1$ (n=0, 1, 2, . . . ).

When a random backoff procedure is started, an STA may continuously monitor a medium while performing countdown on backoff slots according to a determined backoff count value. When the medium is monitored as a busy status, countdown is stopped and on standby, and when the medium becomes idle, the residual countdown may be restarted.

In the example of FIG. 1E, when a packet to be transmitted reaches MAC of STA3, the STA3 may check that a medium is in an idle status and may immediately transmit a frame by as much as the DIFS. The residual STAs may monitor that the medium is busy and may be on standby. Meanwhile, data to be transmitted may be generated in each of STA1, STA2, and STA5, and when each STA may monitor that the medium is idle, each STA may be on standby by as much as the DIFS and then may perform countdown on backoff slots according to a random backoff count value selected by each STA. The example of FIG. 1E corresponds to a case in which the STA2 selects a lowest backoff count value and the STA1 selects a largest backoff count value. That is, FIG. 1E illustrates the case in which residual backoff time of the STA5 at a time point when the STA2 terminates backoff count and begins frame transmission is shorter than residual backoff time of the STA1. The STA1 and the STA5 may stop countdown and may be on standby while the STA2 occupies a medium. When the medium is in an idle status, the STA1 and the STA5 may be on standby by as much as a DIFS and then may restart the stopped backoff count. That is, residual backoff slots corresponding to the residual backoff time may be counted down and then frame transmission may be started. Since the residual backoff time of the STA5 is shorter than the STA1, the STA5 may start frame transmission. While the STA2 occupies the medium, data to be transmitted may also be generated in the STA4. In this case, in terms of the STA4, when the medium is in an idle status, the STA4 may be on standby by as much as the DIFS, may perform countdown according to a random backoff count value selected by the STA4, and then may start frame transmission. The example of FIG. 1E may correspond to the case in which residual backoff time of the STA5 is accidently identical to a random backoff count value of the STA4, and in this case, collision between the STA4 and the STA5 may occur. When collision occurs, both the STA4 and the STA5 may not receive ACK and thus may fail in data transmission. In this case, the STA4 and the STA5 may double a CW value, select a random backoff count value, and then perform countdown. The STA1 may be on standby while a medium is busy due to transmission of the STA4 and the STA5, and when the medium is idle, the STA1 may be on standby by as much as a DIFS and then may start frame transmission after residual backoff time elapses.

Radio Access Technology (Multi-RAT)

Figure 2A:
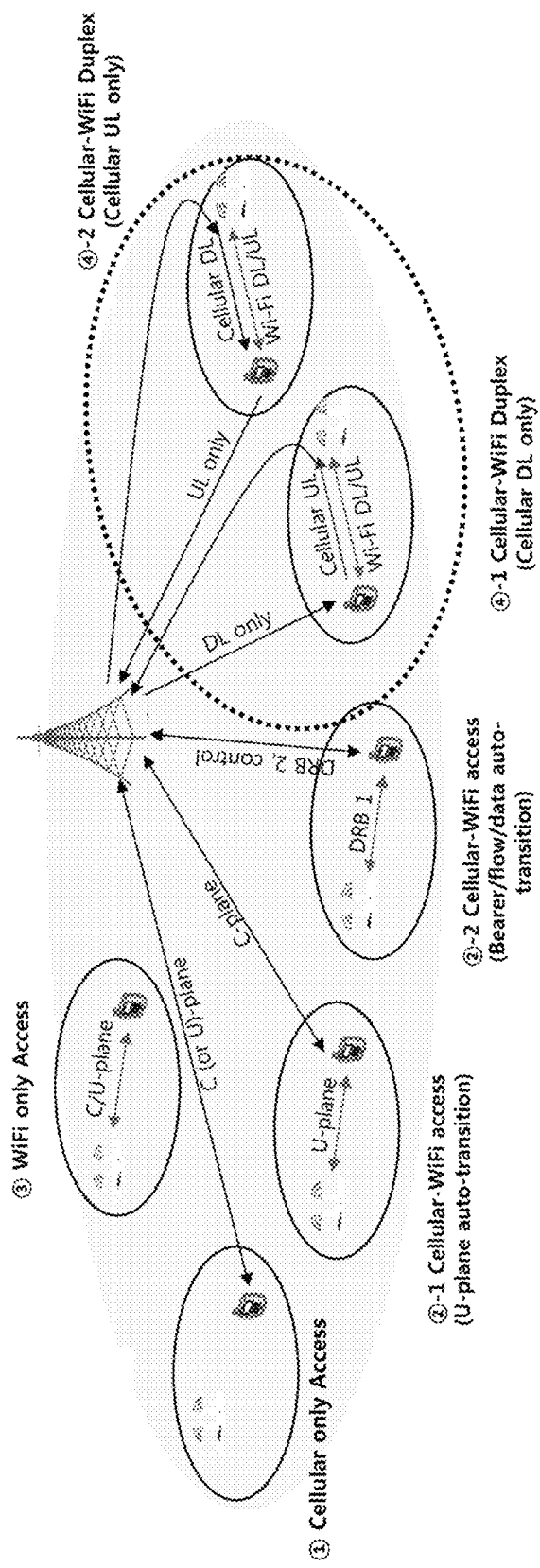
FIGS. 2A and 2B are diagrams illustrating a multi-RAT environment according to embodiments of the present invention.
Figure 2B:
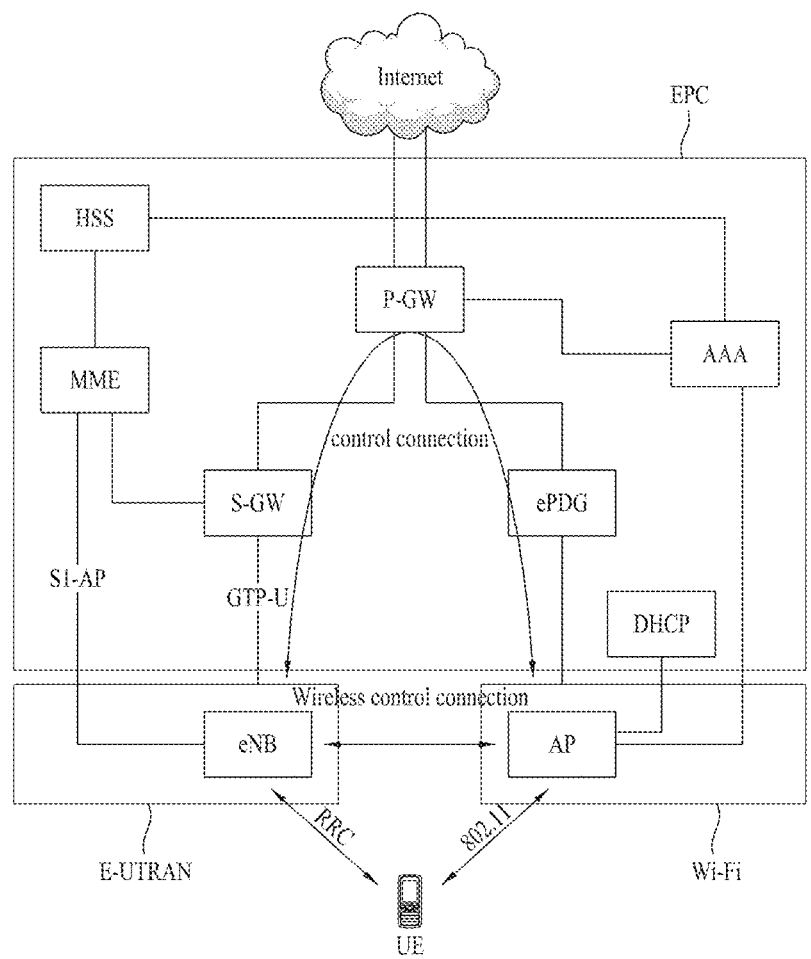

FIGS. 2A and 2B are diagrams illustrating a multi-RAT environment according to embodiments of the present invention.

Prior to description of a multi-RAT environment according to the present invention, an inter RAT technology in a conventional multi-RAT environment will be briefly described. The conventional inter RAT technology is designed based on request of a UE and thus does not require interworking between a wireless LAN and a cellular network. A specific network server may manage wireless LAN information and perform inter RAT handover according to request of the UE. In addition, even if the UE can simultaneously access multi-RAT, the UE accesses multiple RAT using a method for supporting only flow mobility/IP-flow mapping in a network level without control in a radio level.

IFOM (IP Flow Mobility) and MAPCON (Multi Access PDN Connectivity)

Conventionally, a method for supporting multiple RAT by a UE may include IP flow mobility (IFOM) and multiple access PDN connectivity (MAPCON). The IFOM is a WLAN offloading technology of a DSMIPv6-based IP flow in 3G/WiFi seamless offload (Rel-10) of 3GPP. The dual stack mobile IPv6 (DSMIPv6) is a solution for simultaneously supporting IPv4 and IPv6 in a UE and a network and has been adapted because an existing IPv4 network also requires mobility support as IPv6 adaptation has been enlarged and mobility support has been developed as a core technology due to diversity of a mobile communication network. The IFOM is a client-based mobile Internet protocol (MIP) technology for detecting mobility of a UE and indicating the mobility to an agent by the UE. As an agent for managing mobility of a mobile node, a home agent (HA) is present, and the HA may use a flow binding table and a binding cache table. When the PMIPv6 is used, the IFOM may use only DSMIPv6 for the technological reason that it is difficult to manage an IP flow unit.

The MAPCON may be a technology for simultaneous multiple public data network (PDN) connectivity to different access point names (APNs), may be protocol independent, and may use all of the PMIPv6, the GTP, and the DSMIPv6. According to the MAPCON, all data flows that are being transmitted through one PDN are moved.

This conventional technology does not require any control connection between an AP and a cellular network and is performed based on request of a UE. However, in order to enhance overall efficiency of a network via use of multi-RAT, network-based tightly-coupled management is required rather than being dependent upon only request of the UE.

According to embodiments of the present invention, direct control connection may be established between different RATs so as to perform efficient and rapid inter-RAT interworking.

Referring to FIG. 2A, in ①, technical predefinition is necessary such that a UE performs Wi-Fi automatic switching/simultaneous transmission in a state of accessing only a cellular network. AP information management for interworking is performed at the network level (cellular-Wi-Fi) and Wi-Fi discovery and Wi-Fi network access are performed at the device level (cellular-device-Wi-Fi).

②-1 and ②-2 indicate Wi-Fi automatic switching of a user plane, Wi-Fi automatic switching of a flow, Wi-Fi automatic switching of a bearer and Wi-Fi automatic switching of data. Definition of a procedure for, at a UE which wishes to be connected to an AP in an idle state, requesting state switching of the AP is necessary.

When cellular-Wi-Fi U-plane automatic switching is performed according to ②-1, all data is transmitted using Wi-Fi only. When cellular-Wi-Fi U-plane is switched to simultaneous transmission according to ②-2, simultaneous data transmission via Wi-Fi and cellular network using a bandwidth segregation or aggregation scheme is possible. Here, in bandwidth segregation, automatic switching is performed per flow (service/IP flow) as in ②-2 and different flows are transmitted via different RATs. In ②-2, automatic switching per flow may be automatic switching per one or more service/IP flow(s). That is, switching may be performed per flow or per data radio (or EPS) bearer.

After Wi-Fi automatic switching has been performed as in ②, cellular link control based on Wi-Fi is possible as in ③. Control for cellular link paging or radio link failure may be received via a Wi-Fi link.

When downlink reception or uplink transmission of a cellular network is difficult as in ④, a cellular-WiFi Duplex mode may be used. ④-1 of the cellular-WiFi Duplex mode illustrates the case in which a cellular network is responsible for only downlink reception and WiFi is responsible for uplink. ④-2 illustrates the case in which a cellular network is responsible for only uplink transmission and WiFi is responsible for downlink. WiFi may be responsible for both uplink/downlink.

In the case of a downtown area with numerous users, since QoS of users may not be satisfied due to high DL data load of the cellular network. When at least a portion of DL data of the cellular network is offloaded to Wi-Fi, overall QoS of the user and system performance may be satisfied. In the case of Wi-Fi, an AP and a non-AP may occupy resources with contention, as described above. That is, current most 802.11 wireless LAN systems may occupy data resources via a DCF method in which an AP (DL data) or STAs (UL data) equally contend with each other, and thus DL and UL may equally contend with each other and contention may become more serious as the number of STAs is increased. Accordingly, as the number of UEs using WiFi within AP coverage is increased, a problem may arise in that performance is degraded.

In addition, a UE positioned at a cell boundary area of a cellular network has not problem in terms of DL reception transmitted from an eNB but may cause high interference at adjacent cells due to UL transmission with high power. In addition, a UE positioned indoor has not problem in terms of DL reception transmitted from an eNB due to enhanced performance (e.g., 3D beam forming) of the eNB but has a difficulty in UL transmission due to limited performance of the UE.

An embodiment of the present invention proposes a method in which a DL only Wi-Fi system may be installed in a downtown area with high data load or a UL only Wi-Fi system may be installed at a cell boundary or in-door area, thereby enhancing Wi-Fi system performance as well as cellular performance.

Interworking of Multi-RAT

FIG. 2B is a diagram showing a multi-RAT environment according to another embodiment of the present invention.

In the multi-RAT environment shown in FIG. 4B, two different RATs are merged. Assume that a first RAT is a cellular system (e.g., an LTE/LTE-A or WiBro system) and a second RAT is a Wi-Fi system. The present invention is not limited thereto. In the Multi-RAT environment of FIG. 4B, control connection for interworking between the first and the second RAT is provided. The control connection, for example, may be a wireless control connection between an eNB of the first RAT and an eNB of the second RAT or a wired control connection through a backbone network such as P-GW (Public data network Gateway) or EPC (Evolved Packet Core).

Interworking Entity

In order to increase overall system energy efficiency, an interworking entity (hereinafter, referred to as an IWE) of the multi-RAT may instruct Tx/Rx power of a specific RAT to be turned on/off or control status transition of a node (e.g., AP) of the specific RAT, under specific conditions. In an AP jamming environment, interference mitigation between APs may also be controlled by the IWE.

Although the IWE may be an arbitrary node located in the first RAT, for example, the cellular network, it is assumed that an interworking function is performed in the following three entities. Accordingly, the IWE may be any one of (1), (2) and (3) and the present invention is not limited thereto.

(1) eNB—reuse of an existing entity (2) MME—reuse of an existing entity (3) interworking management entity (IWME)—definition of a new entity Before the UE simultaneously accesses multiple RATs, the IWE may aid the UE in selecting an optimal RAT or AP. To this end, the IWE may collect information on the second RAT such as Wi-Fi from the UE or the AP in advance.

For peak throughput and data traffic offloading, the UE may simultaneously support the first RAT and the second RAT via multi-RAT interworking. Here, the first RAT may be referred to as a primary network or a primary system and the second RAT may be referred to as a secondary network or a secondary system. For example, the UE may be configured to simultaneously support LTE/LTE-A and Wi-Fi (near field communication system such as WLAN/802.11). Such UE may be referred to as a multi-system capability UE in the present specification.

In the network structure shown in FIG. 4B, the primary system has wider coverage and may be a network for control information transmission. Examples of the primary system include a WiMAX or LTE (LTE-A) system. The secondary system has narrow coverage and may be a system for data transmission. Examples of the secondary network include a wireless local area network system such as WLAN or Wi-Fi.

The embodiments of the present invention will be described on the following assumptions.

Interworking Function

An interworking function is related to an interworking related procedure which may occur between eNB-UEs or eNB-APs and an IWE stores/manages AP information. The IWE stores/manages information on APs located in coverage thereof. Assume that the AP of the secondary system (e.g., Wi-Fi) and the IWE of the Primary system (e.g., LTE or WiMAX) may share necessary information via a control connection. In order to enable the AP and the IWE to share information, the following methods 1) to 4) may be used.

Method 1) Wired control connection

A network interface is established via a backbone network.

Method 2) Wireless control connection

According to Method 2), the AP has an air interface with the eNB and may be referred to as an eAP. For example, the eAP supports an LTE protocol stack for communication with the eNB as well as 802.11 MAC/PHY. The eAP may be regarded as an LTE UE in a relationship with the eNB and may communicate with the eNB.

Method 3) The AP and the IWE collect information on each other via a server rather than via an existing network such as an access network discovery service function (ANDSF).

In the embodiments of the present invention, the AP may switch the state thereof to an ON/OFF state (or an active/idle (sleep) mode) for overall system efficiency. The information on the AP, for example, state information, may be stored and managed by the IWE. As a method for, at the IWE, storing and managing the information on the AP, the following four methods A to D may be used depending on by which entity of the first RAT the IWE is implemented and the present invention is not limited thereto.

Interworking Interface

Method A) An air interface between the eNB and the AP is used.

The eNB controls the AP using a wireless control connection with the AP, similarly to a general UE.

Method B) A backhaul interface between the eNB and the AP is used.

The eNB controls the AP using a wired control connection with the AP.

Method C) A control interface between the MME and the AP is used.

The AP is controlled using a control connection between the MME and the AP (that is, the secondary system).

Method D) A control interface between the IWME and the AP is used.

The AP is controlled using a control connection between the IWME and the AP (that is, the secondary system).

Figure 3:
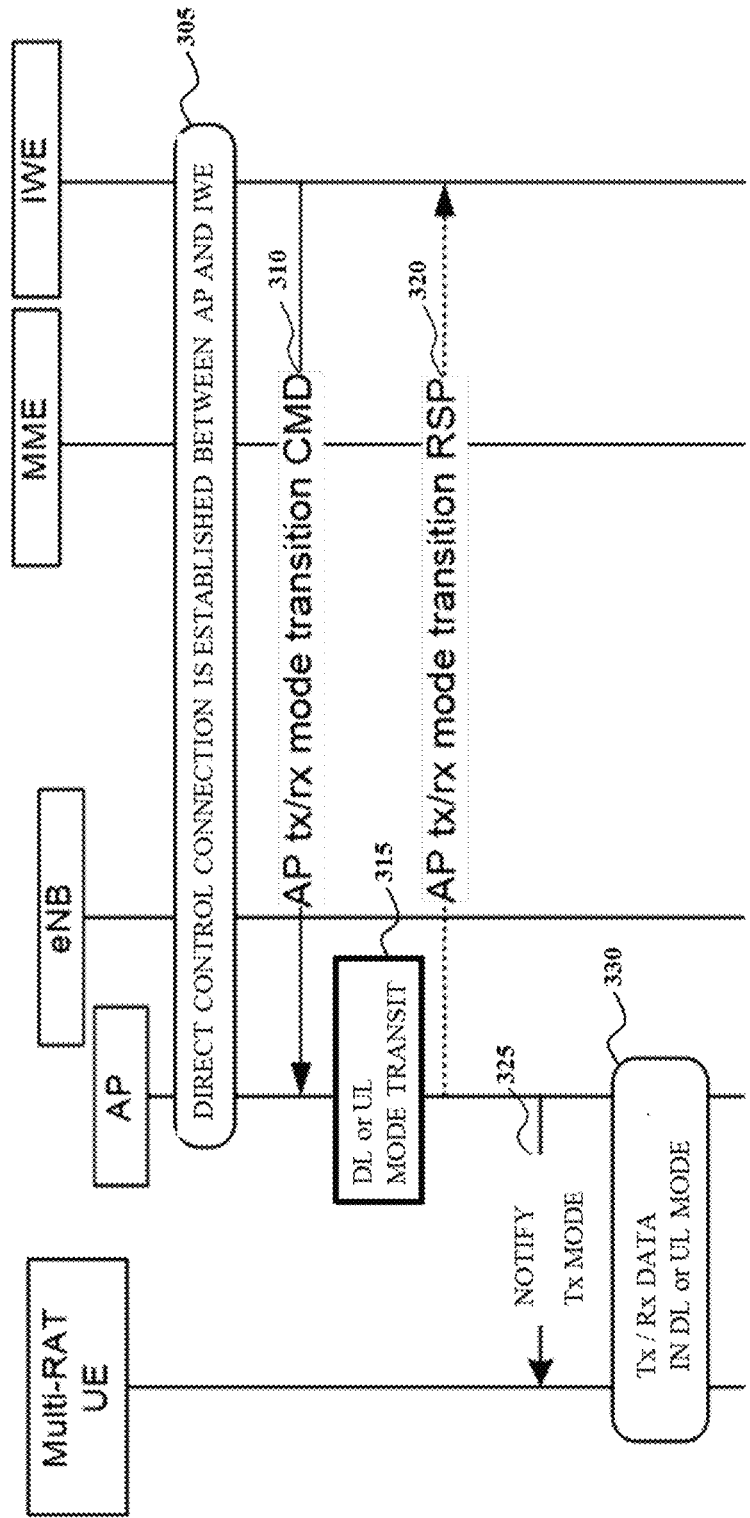
FIG. 3 is a diagram illustrating flow of a control method of an eNB and a method for transmitting and receiving data according to an embodiment of the present invention.

FIG. 3 is a diagram illustrating flow of a control method of an eNB and a method for transmitting and receiving data according to an embodiment of the present invention. In order to understand the embodiment of FIG. 3, the above descriptions may be referred to. In the embodiment of FIG. 3, it may be assumed that an eNB of a second RAT is an AP of a WLAN and that an entity of a first RAT for controlling the eNB of the second RAT is an IWE of a cellular network. In addition, it may be assumed that a UE is a Multi-RAT UE that can simultaneously access an eNB of the first RAT and an eNB of the second RAT. However, the present invention is not limited thereto, and for example, the entity of the first RAT may be an eNB or a MME.

As described above, for interworking between the entity of the first RAT and the eNB of the second RAT, wired or wireless direct control connection may be established (305). Accordingly, the entity of the first RAT may control an operation of the eNB of the second RAT through the direct control connection.

Operating Mode of eNB of Second RAT

A plurality of operating modes for defining an operation of an eNB of a second RAT may be defined according to an embodiment of the present invention. For example, an operating mode of the eNB of the second RAT may include at least one of a first mode for permitting only downlink transmission in the eNB of the second RAT, a second mode in which downlink transmission is prioritized over uplink reception in the eNB of the second RAT, a third mode for permitting only uplink reception in the eNB of the second RAT, a fourth mode in which downlink transmission is prioritized over downlink transmission in the eNB of the second RAT, and a fifth mode in which uplink reception and uplink transmission are equally performed.

The eNB of the second RAT may occupy a radio resource of the second RAT through contention with a UE, and when the eNB of the second RAT occupies the radio resource, downlink transmission may be performed, and when the UE occupies the radio resource, uplink reception may be performed. Here, the radio resource may be the aforementioned medium or a time-frequency resource of a radio channel. For each operating mode, opportunity or possibility that the eNB of the second RAT occupies a radio resource may be changed. For example, the possibility that the eNB of the second RAT occupies a radio resource in contention with one UE may be 1 in the first mode, may exceed 0.5 in the second mode, may be 0 in the third mode, may be less than 0.5 in the fourth mode, and may be 0.5 in the fifth mode, but the present invention is not limited thereto. As such, when an operating mode of an eNB is changed, the opportunity that the eNB of the second RAT occupies a radio resource of the second RAT through contention with an UE that accesses the first RAT may be changed.

Figure 4:
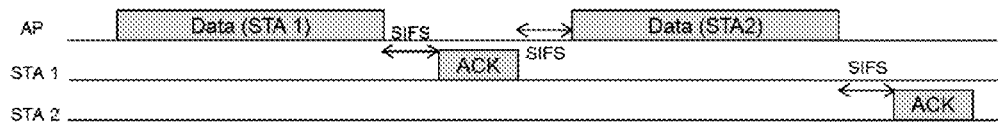
FIG. 4 is a diagram illustrating an operating mode of an eNB according to an embodiment of the present invention.
Figure 4:
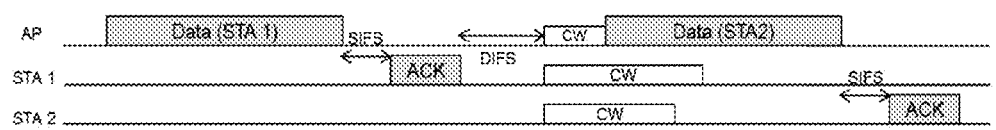
Figure 4:
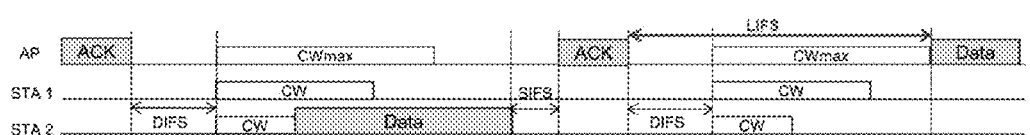
Figure 4:
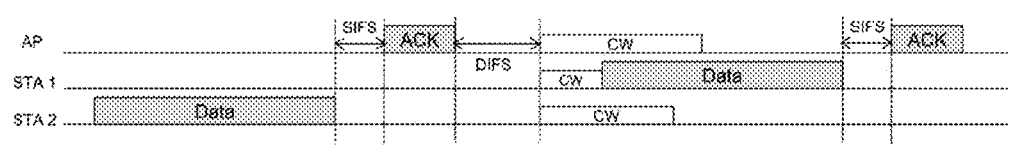

FIG. 4 is a diagram for explanation of an operation of an eNB of a second RAT in first to fourth modes. FIG. 4(A) illustrates a first mode in which the eNB of the second RAT supports only downlink transmission. As described above, before an AP or a UE performs general downlink or uplink transmission but not an ACK response, it needs to be checked that a radio resource is in an idle status during a DIFS period. However, in the first mode, a DIFS may be set in the UE, and shorter time than the DIFS may be set in the eNB of the second RAT. For example, an SIFS or shorter time than the SIFS may be set in the eNB of the second RAT. Accordingly, the eNB of the second RAT may continuously transmit downlink data to STA 2 after last ACK, after the SIFS, immediately, or after waiting shorter time than the SIFS. In FIG. 4(A), other STA 1 and STA 2 need to be on standby for a DIFS after ACK of the STA 1, but the eNB of the second RAT is on standby for time equal to or less than the SIFS, and thus the eNB of the second RAT may always occupy radio resources.

FIG. 4(B) illustrates a second mode in which the eNB of the second RAT prioritizes downlink transmission over uplink reception. That is, the possibility that radio resources are used in downlink transmission is high compared with the case of downlink transmission. Unlike in FIG. 4(A), the same DIFS may be set in the eNB of the second RAT and UEs. However, the DIFS may be set to be different from a random backoff value after a DIFS period, that is, CW. The CW may be randomly selected between CW min and CW max. When a value of CW min or CW max set in the eNB of the second RAT is set to be smaller than values of CW min/max set in a UE, the possibility that the eNB of the second RAT occupies a radio resource may be increased.

FIG. 4(C) illustrates a third mode in which the eNB of the second RAT supports only uplink reception. In the third mode, a DIFS is set in a UE but longer time than the DIFS may be set in the eNB of the second RAT. For example, a period set in the eNB of the second RAT may be referred to as a long inter frame space (LIFS). The LIFS may be DIFS+CW max or when the AIFS, the LIFS may be AIFS [last]+CW max, but the present invention is not limited thereto. For example, after detecting that a radio channel is idle, an AP may be on standby for the LIFS and then may transmit data. That is, the eNB of the second RAT may occupy a radio resource only upon recognizing that any UE does not attempt to occupy radio recourse, the eNB of the RAT may occupy the radio resource.

FIG. 4(D) illustrates a fourth mode in which the eNB of the second RAT prioritizes uplink reception over downlink transmission. That is, the possibility that radio resources are used in uplink reception is high compared with the case of downlink transmission. Unlike in FIG. 4(B), a value of CW min or CW max set in the eNB of the second RAT is set to be greater than values of CW min/max set in the UE, the possibility that the eNB of the second RAT occupies a radio resource is reduced, and thus uplink reception is prioritized.

When RTS/CTS are used, the eNB of the second RAT or a UE may transmit an RTS message instead of uplink/downlink data in the aforementioned four modes.

Determination of Operating Mode

An eNB of a first RAT may determine an operating mode of an eNB of a second RAT. For example, the entity of the first RAT may determine the eNB of the second RAT to support or prioritize only a unidirectional link, that is, uplink reception or downlink transmission. Determination of the operating mode may be performed based on at least one of, for example, coverage and network stratus of the first RAT, coverage and network stratus of the second RAT, and positional information of the eNB of the second RAT or the UE. The coverage and network stratus of the first RAT, the and network stratus of the second RAT, the positional information of the UE, and so on may be measured by an entity of the first RAT or may be received from the UE or the eNB of the second RAT.

The network status of the first RAT or second RAT may include information about uplink/downlink data traffic and uplink/downlink data rate. The network status may be related to all UEs served by a specific cell or related only to one UE. In addition, the network status may indicate interference of uplink/downlink, for example, inter-RAT interference, intra-RAT interference, inter-cell interference, or intra-cell interference.

The coverage of the first RAT or the second RAT and the positional information of the eNB of the second RAT or the UE may indicate whether a predetermined UE is positioned at a boundary of the corresponding coverage or at a center of the coverage. For example, an entity of the first RAT may determine an operating mode so as to support only DL transmission or UL reception by the eNB of the second RAT installed in a specific area (e.g., downtown area, cell boundary, and indoor).

Trigger Condition for Transition of Operating Mode

A trigger condition for transition of an operating mode by an entity of a first RAT is now described. When downlink data traffic of the first RAT is equal to or more than a first threshold value, a current mode may transit into a first mode or a second mode. When an adjacent cell positioned around a serving cell of the first RAT of a specific UE experiences a second threshold value or more, the current mode may transit into a third mode or a fourth mode. In this case, the size of interference between adjacent cells may be transmitted and received through a backhaul interface between eNBs, for example, an X2 interface. When an uplink transfer rate of the first RAT is equal to or less than a third threshold value, the current mode may transit into a third mode or a fourth mode. When data load of the eNB of the second RAT is a fourth threshold value, the current mode may transit into the first mode or the second mode. In addition, when a downlink transfer rate of the eNB of the second RAT is equal to or less than a fifth threshold value, the current mode may transit into a first mode or a second mode.

The trigger condition according to the present invention is not limited thereto, and there may be other trigger conditions. Referring back to FIG. 3, the entity of the first RAT may transmit a message for requesting for transition into a determined operating mode to the eNB of the second RAT (310).

The eNB of the second RAT may transit a transmission mode (315) and transmit a response message of the entity of the first RAT (320).

Figure 5:
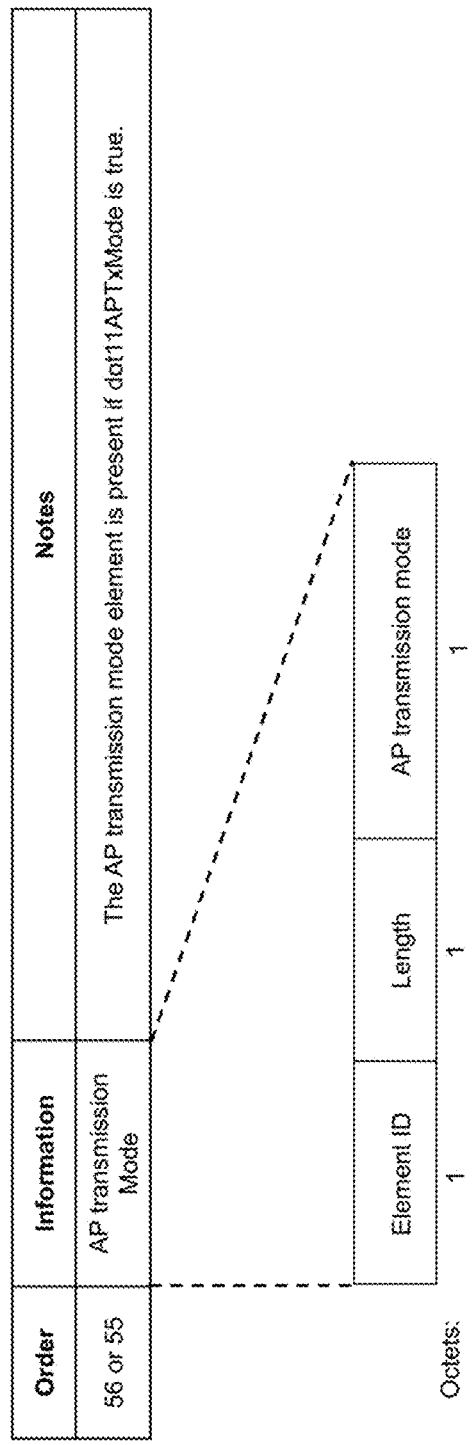
FIG. 5 is a diagram illustrating a beacon or probe response frame body according to an embodiment of the present invention.

The eNB of the second RAT that receives the request for transition of a transmission mode from the entity of the first RAT needs to notify the UE of that a transmission of the eNB transits. For example, the eNB of the second RAT illustrated in FIG. 5 may notify the UE of transition of a transmission mode through a beacon or probe response (325).

Figure 6:
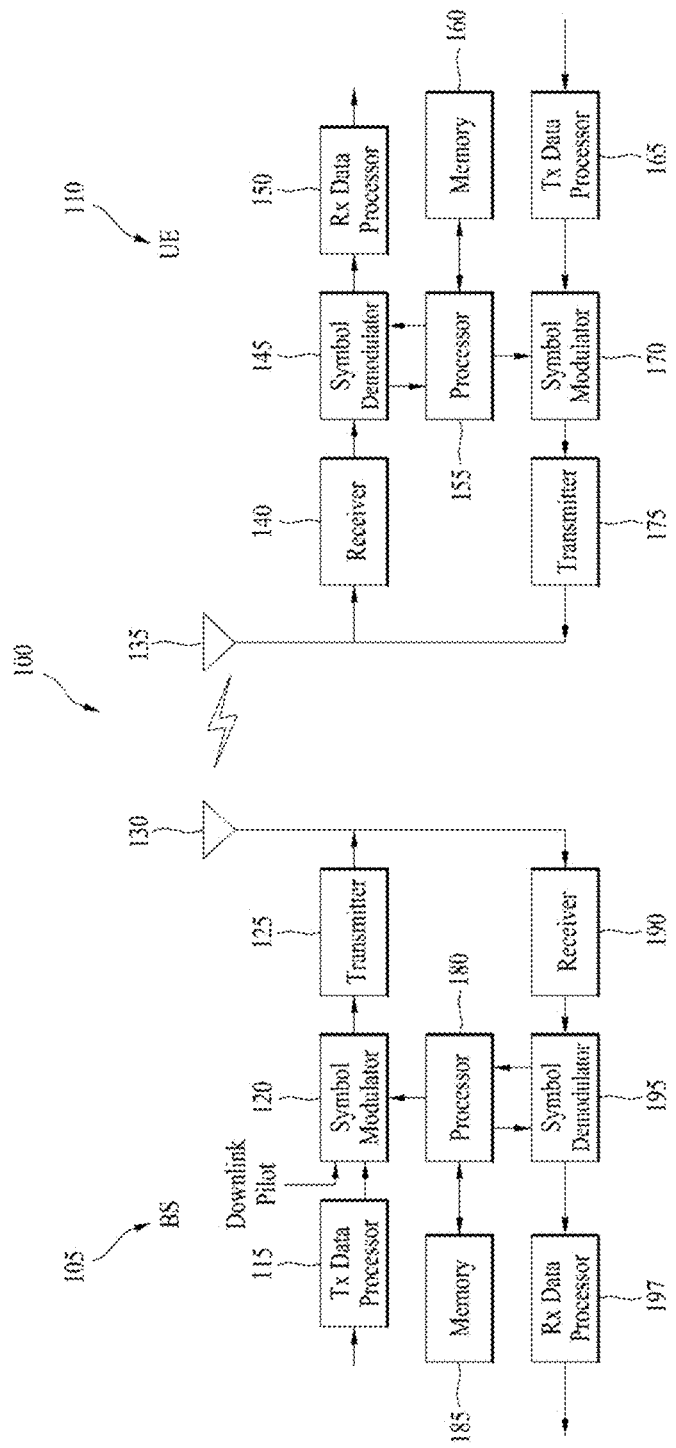
FIG. 6 is a diagram illustrating a UE and an eNB according to an embodiment of the present invention.

FIG. 6 is a diagram illustrating a UE and an eNB according to an embodiment of the present invention.

The eNB illustrated in FIG. 6 may be an IWE of a first RAT or an eNB (e.g., AP) of a second RAT. A RAT 100 may be the aforementioned first RAT or second RAT. Although FIG. 9 illustrates one eNB 105 and one UE 110 (which includes a D2D UE), the RAT 100 may include one or more eNBs and/or one or more UEs.

Referring to FIG. 6, the base station 105 may include a transmission (Tx) data processor 115, a symbol modulator 120, a transmitter 125, a transmit/receive antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmit/receive antenna 135, a processor 155, a memory 160, a receiver 140, a symbol demodulator 155, and an Rx data processor 150. Although one antenna 130 and one antenna 135 are respectively included in the base station 105 and the UE 110, each of the base station 105 and the UE 110 includes a plurality of antennas. Accordingly, the base station 105 and the UE 110 according to the present invention support a Multiple Input Multiple Output (MIMO) system. The base station 105 and the UE 110 according to the present invention support both a Single User-MIMO (SU-MIMO) scheme and a Multi User-MIMO (MU-MIMO) scheme.

In downlink, the Tx data processor 115 receives traffic data, formats and codes the received traffic data, interleaves and modulates the coded traffic data (or performs symbol mapping), and provides modulated symbols ("data symbols"). The symbol modulator 120 receives and processes the data symbols and pilot symbols and provides a symbol stream.

The symbol modulator 120 multiplexes data and pilot signals and transmits the multiplexed data to the transmitter 125. At this time, the transmitted symbols may be data symbols, pilot symbols or zero signal values. In each symbol period, the pilot symbols may be consecutively transmitted. The pilot symbols may be Frequency Division Multiplexed (FDM), Orthogonal Frequency Division Multiplexed (OFDM), Time Division Multiplexed (TDM) or Code Division Multiplexed (CDM) symbols.

The transmitter 125 receives and converts the symbol stream into one or more analog signals, additionally adjusts (e.g., amplifies, filters, and frequency-up-converts) the analog signals, and generates a downlink signal suitable for transmission through a radio channel. Subsequently, the downlink signal is transmitted to the UE through the antenna 130.

In the UE 110, the receive antenna 135 receives the downlink signal from the eNB and provides the received signal to the receiver 140. The receiver 140 adjusts (e.g., filters, amplifies, frequency-down-converts) the received signal and digitizes the adjusted signal so as to acquire samples. The symbol demodulator 145 demodulates the received pilot symbols and provides the demodulated pilot symbols to the processor 155, for channel estimation.

The symbol demodulator 145 receives downlink frequency response estimation values from the processor 155, performs data demodulation with respect to the received data symbols, acquires data symbol estimation values (which are estimation values of the transmitted data symbols), and provides the data symbol estimation values to the Rx data processor 150. The Rx data processor 150 demodulates (that is, symbol-demaps and deinterleaves) the data symbol estimation values, decodes the demodulated values, and restores transmitted traffic data.

The processes performed by the symbol demodulator 145 and the Rx data processor 150 are complementary to the processes performed by the symbol modulator 120 and the Tx data processor 115 of the base station 105.

In the UE 110, in uplink, the Tx data processor 165 processes the traffic data and provides data symbols. The symbol modulator 170 receives the data symbols, multiplexes the data symbols, performs modulation with respect to the symbols and provides a symbol stream to the transmitter 175. The transmitter 175 receives and processes the symbol stream, generates an uplink signal, and transmits the uplink signal to the base station 105 through the transmit antenna 135.

The base station 105 receives the uplink signal from the UE 110 through the receive antenna 130 and the receiver 190 processes the received uplink signal and acquires samples. Subsequently, the symbol demodulator 195 processes the samples and provides pilot symbols received in the uplink and data symbol estimation values. The Rx data processor 197 processes the data symbol estimation values and restores traffic data transmitted from the UE 110.

The respective processors 155 and 180 of the UE 110 and the base station 105 instruct (e.g., control, adjust, manages, etc.) the respective operations of the UE 110 and the base station 105. The processors 155 and 180 may be connected to the memories 160 and 185 for storing program codes and data. The memories 160 and 185 may be respectively connected to the processors 155 and 180 so as to store operating systems, applications and general files.

Each of the processors 155 and 180 may also be referred to as a controller, a microcontroller, a microprocessor, a microcomputer, etc. The processors 155 and 180 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 155 and 180.

If the embodiments of the present invention are implemented by firmware or software, the firmware or software may be configured to include modules, procedures, functions, etc. for performing the functions or operations of the present invention. The firmware or software configured to perform the present invention may be included in the processors 155 and 180 or may be stored in the memories 160 and 185 so as to be driven by the processors 155 and 180.

Layers of the radio interface protocol between the UE and the eNB in the wireless communication system (network) may be classified into a first layer (L1), a second layer (L2) and a third layer (L3) based on the three low-level layers of the well-known Open System Interconnection (OSI) model of a communication system. A physical layer belongs to the first layer and provides an information transport service through a physical channel. A Radio Resource Control (RRC) layer belongs to the third layer and provides control radio resources between the UE and the network. The UE and the eNB exchange RRC messages with each other through a wireless communication network and the RRC layer.

In the present specification, although the processor 155 of the UE and the processor 180 of the base station perform process signals and data except for a data transmission/reception function and a storage function of the UE 110 and the base station 105, for convenience of description, the processors 155 and 180 are not specially described. Although the processors 155 and 180 are not specially described, the processors 155 and 180 may perform a series of operations such as data processing except for a signal transmission/reception function and a storage function.

When the base station 105 is the entity of the first RAT, a processor may determine an operating mode of the eNB of the second RAT, and a transmitter may transmit a message for requesting for transition into a determined operating mode to the eNB of the second RAT. In this case, the message may change the opportunity that the eNB of the second RAT occupies a radio resource of the second RAT through contention with a UE that accesses the first RAT.

When the base station 105 is the eNB of the second RAT, a receiver may receive the message for requesting for transition into an operating mode of the eNB of the second RAT from the entity of the first RAT, and a process may transit an operating mode based on the received message. In this case, the processor may change the opportunity that the eNB of the second RAT occupies a radio resource of the second RAT through contention with a UE that accesses the first RAT.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

As described above, embodiments of the present invention may be various mobile communication systems.

The invention claimed is:

1. A method for controlling an access point (AP) of a wireless local area network (WLAN) by an entity of a cellular network, the method comprising:
   selecting an operating mode of the AP from among a downlink only mode, a downlink prioritized mode, an uplink only mode and an uplink prioritized mode; and
   transmitting, to the AP, an operating mode change request indicating the selected operating mode,
   wherein an inter-frame space (IFS) or a contention window (CW) of the AP is changed according to the operating mode indicated by the operating mode change request, and
   wherein the IFS of the AP is set to be equal to or less than a minimum IFS when the downlink only mode is selected, the CW of AP is set to be less than a CW of the UE when the downlink prioritized mode is selected, the IFS of the AP is set to be equal to or more than a maximum IFS when the uplink only mode is selected, and the CW of the AP is set to be equal to or more than the CW of the UE when the uplink prioritized mode is selected.

2. The method according to claim 1, wherein the selecting of the operating mode comprises:
   selecting the downlink only mode or the downlink prioritized mode when a size of data traffic of the cellular network is equal to or more than a first threshold value, data load of the WLAN is equal to or more than a second threshold value, or a data rate of the WLAN is equal to or less than a third threshold value; and
   selecting the uplink only mode or the uplink prioritized mode when inter-cell interference in the cellular network is equal to or more than a fourth threshold value or an uplink data rate in the cellular network is equal to or less than a fifth threshold value.

3. The method according to claim 1, wherein:
   the entity of the first RAT is a mobility management entity (MME) of the cellular network, an eNodeB of the cellular network, or an interworking entity (IWE) of the cellular network.

4. A method for transmitting and receiving data under control of an entity of a cellular network by an access point (AP) of a wireless local area network (WLAN), the method comprising:
   receiving, from the entity of the cellular network, an operating mode change request indicating an operating mode of the AP selected from among a downlink only mode, a downlink prioritized mode, an uplink only mode and an uplink prioritized mode; and
   transiting the operating mode based on the operating mode change request,
   wherein an inter-frame space (IFS) or a contention window (CW) of the AP is changed according to the operating mode indicated by the operating mode change request, and
   wherein the IFS of the AP is set to be equal to or less than a minimum IFS when the downlink only mode is selected, the CW of AP is set to be less than a CW of a user equipment (UE) when the downlink prioritized mode is selected, the IFS of the AP is set to be equal to or more than a maximum IFS when the uplink only mode is selected, and the CW of the AP is set to be equal to or more than the CW of the UE when the uplink prioritized mode is selected.

5. The method according to claim 4, further comprising:
   transmitting information indicating transition into the operating mode to the UE through a beacon signal or a probe response.

6. The method according to claim 4,
   wherein the downlink only mode or the downlink prioritized mode is selected when a size of data traffic of the cellular network is equal to or more than a first threshold value, data load of the WLAN is equal to or more than a second threshold value, or a data rate of the WLAN is equal to or less than a third threshold value; and
   wherein the uplink only mode or the uplink prioritized mode is selected when inter-cell interference in the cellular network is equal to or more than a fourth threshold value or an uplink data rate in the cellular network is equal to or less than a fifth threshold value.

7. An entity of a cellular network for controlling an access point (AP) of a wireless local area network (WLAN), the entity comprising:
   a processor for selecting an operating mode of the AP from among a downlink only mode, a downlink prioritized mode, an uplink only mode and an uplink prioritized mode; and
   a transmitter for transmitting, to the AP, an operating mode change request indicating the selected operating mode,
   wherein an inter-frame space (IFS) or a contention window (CW) of the AP is changed according to the operating mode indicated by the operating mode change request, and
   wherein the IFS of the AP is set to be equal to or less than a minimum IFS when the downlink only mode is selected, the CW of AP is set to be less than a CW of the UE when the downlink prioritized mode is selected, the IFS of the AP is set to be equal to or more than a maximum IFS when the uplink only mode is selected, and the CW of the AP is set to be equal to or more than the CW of the UE when the uplink prioritized mode is selected.

8. An access point (AP) of a wireless local area network (WLAN) for transmitting and receiving data under control of an entity of a cellular network, the AP comprising:
   a receiver for receiving, from the entity of the cellular network, an operating mode change request indicating an operating mode of the AP selected from among a downlink only mode, a downlink prioritized mode, an uplink only mode and an uplink prioritized mode; and
   a processor for transiting the operating mode based on the operating mode change request,
   wherein an inter-frame space (IFS) or a contention window (CW) of the AP is changed according to the operating mode indicated by the operating mode change request, and
   wherein the IFS of the AP is set to be equal to or less than a minimum IFS when the downlink only mode is selected, the CW of AP is set to be less than a CW of a user equipment (UE) when the downlink prioritized mode is selected, the IFS of the AP is set to be equal to or more than a maximum IFS when the uplink only mode is selected, and the CW of the AP is set to be equal to or more than the CW of the UE when the uplink prioritized mode is selected.

* * * * *